United States Patent [19]

Howland

[11] 3,875,696
[45] Apr. 8, 1975

[54] TOY DEVICE FOR SIMULATING THE SOUND OF A MOTOR VEHICLE

[75] Inventor: Richard E. Howland, Bellingham, Mass.

[73] Assignee: National Acceptance Company of America, Chicago, Ill.

[22] Filed: Jan. 2, 1974

[21] Appl. No.: 429,502

[52] U.S. Cl................... 46/232; 46/175 R; 46/191
[51] Int. Cl........................ A63h 5/00; A63h 33/26
[58] Field of Search................. 46/232, 175 R, 191

[56] References Cited
UNITED STATES PATENTS

| | | | |
|---|---|---|---|
| 3,131,507 | 5/1964 | Richter | 46/175 R |
| 3,160,984 | 12/1964 | Ryan | 46/232 |
| 3,391,489 | 7/1968 | Lohr et al. | 46/232 |
| 3,559,333 | 2/1971 | Manzo | 46/191 |

*Primary Examiner*—Louis G. Mancene
*Assistant Examiner*—Robert F. Cutting
*Attorney, Agent, or Firm*—Salter & Michaelson

[57] ABSTRACT

A toy device for simulating the sound of a motor vehicle, said device including a rotatable impeller that is engagable with a resonator member for producing the simulated motor vehicle sound, the resonator member being pivotally movable into engagement with the impeller by a remote controlled actuator that simultaneously causes a motor to be energized that rotates the impeller.

10 Claims, 7 Drawing Figures

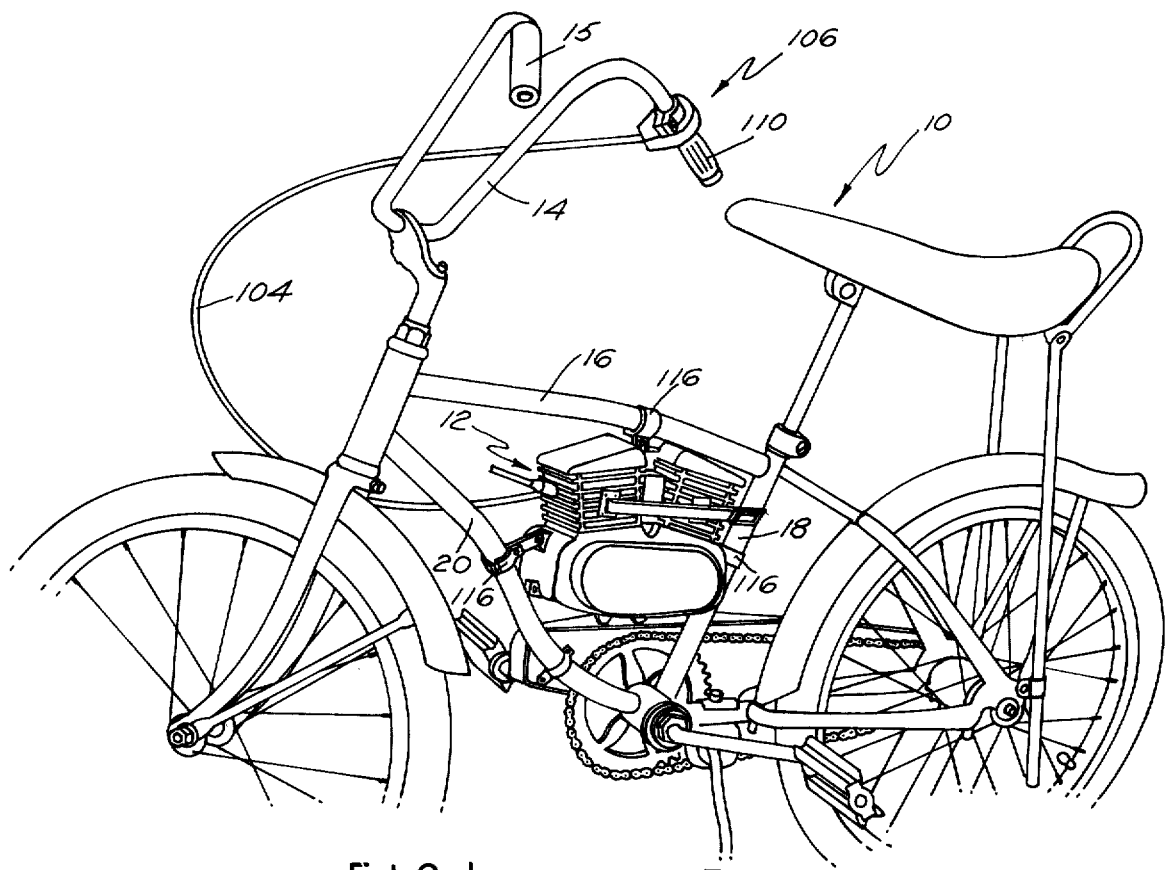
FIG. 1
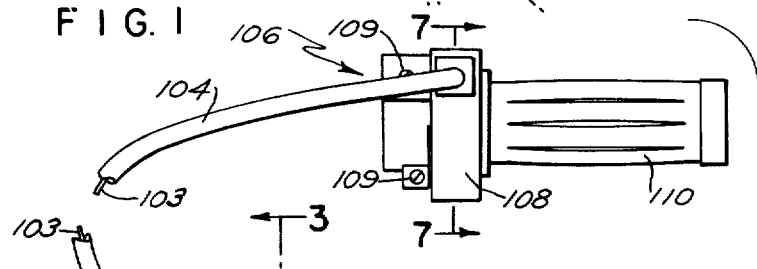
FIG. 2
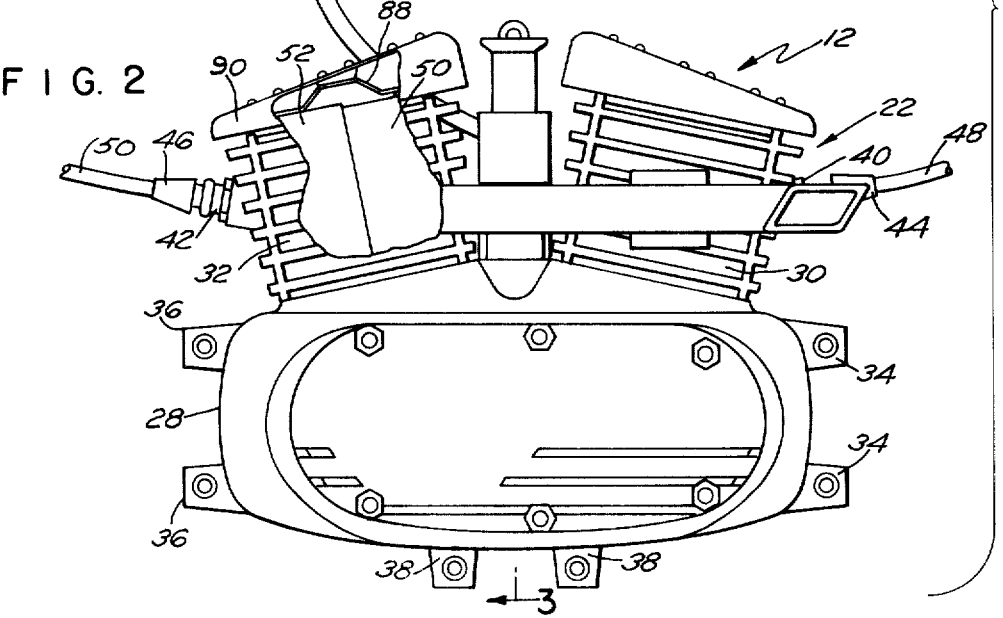

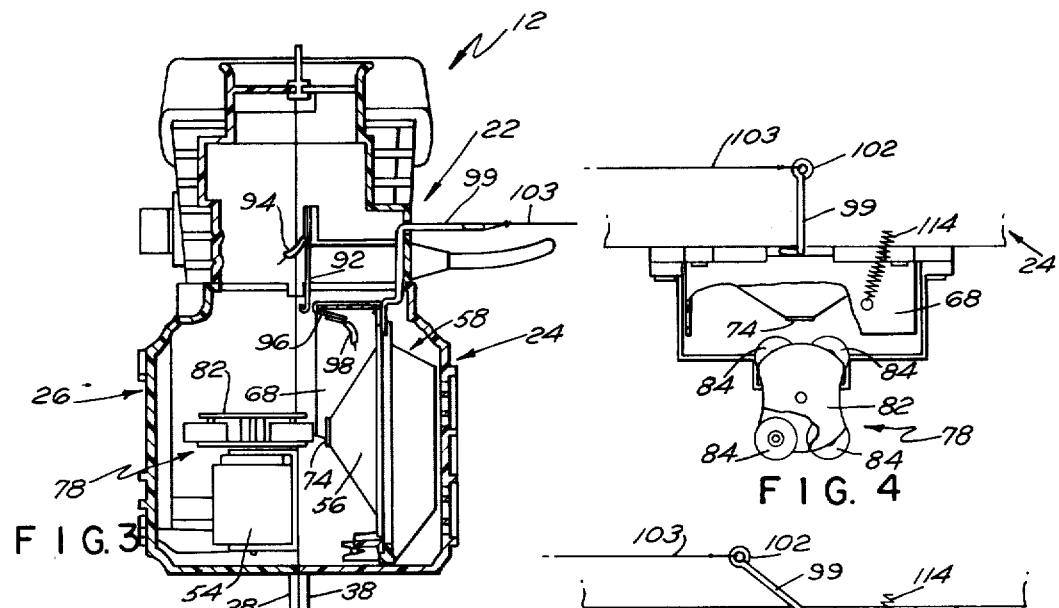
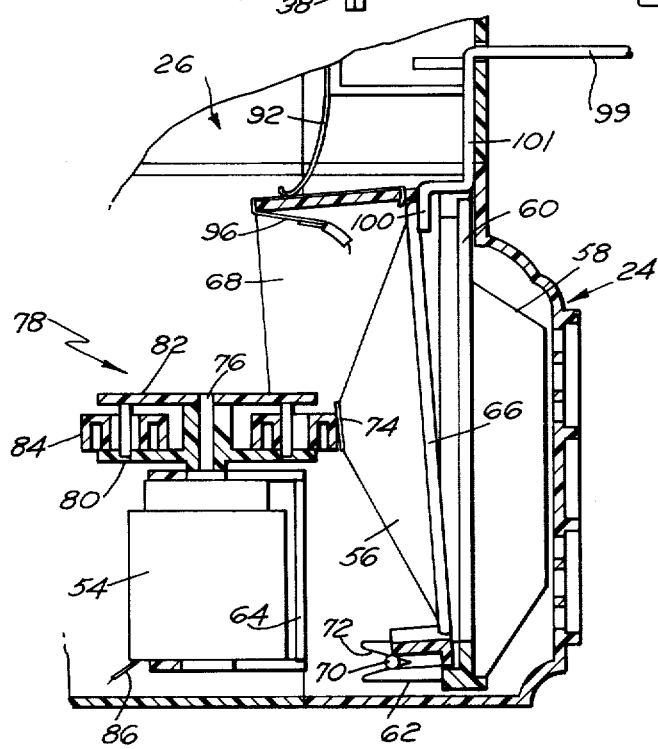
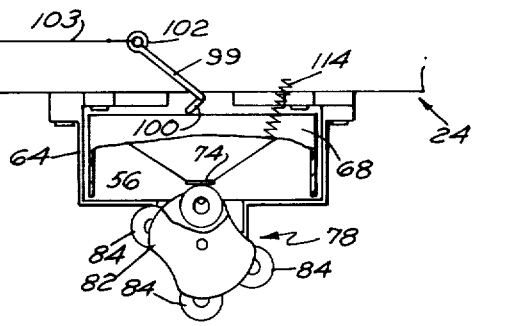
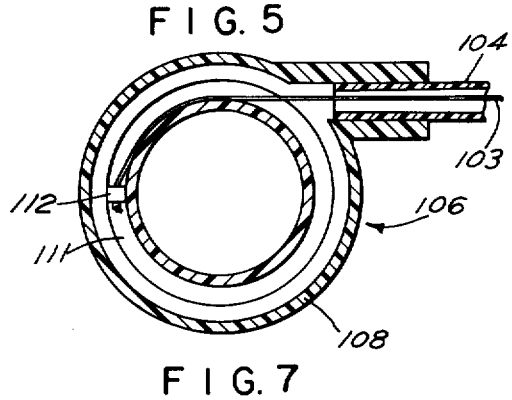
FIG. 3
FIG. 4
FIG. 5
FIG. 6
FIG. 7

3,875,696

TOY DEVICE FOR SIMULATING THE SOUND OF A MOTOR VEHICLE

BACKGROUND OF THE INVENTION

The present invention relates to a motor simulating device and more particularly relates to a toy device for simulating the sound of a motor vehicle such as a motorbike.

Simulated motor sounding devices have attempted heretofore to simulate the sound of a motorbike or motorcycle, or in some instances have been applied to a toywheeled vehicles for simulating the sound of a racing vehicle. In several of the prior known types of motor sounding devices, a cone type resonator was utilized that was engaged by angularly spaced lugs mounted on a rapidly rotated impeller, the resonator emitting a sound simulating that of an internal combustion engine as the lugs repetitively struck the resonator.

Although such motor simulating sounding devices to some degree accomplished the purpose intended, they were generally complicated in construction and required controls that were relatively sophisticated for a children's toy and therefore were prohibitive in cost.

SUMMARY OF THE INVENTION

The present invention relates to a relatively inexpensive toy device for simulating the sound of a motor vehicle and includes a resonator member that is mounted for pivotal movement in the housing of the device. A control member located remotely of the housing is provided for actuating a motor operated impeller and for simultaneously moving the resonator member into a position for engagement by the impeller. Thus, when the remote control member is actuated by the operator, the motor rotates the impeller, and the resonator member is moved into engagement with the rotating impeller for simulating the sound of a motor vehicle.

Accordingly, it is an object of the present invention to provide a toy device for simulating the sound of a motor vehicle, wherein a resonator member located adjacent to a rotating impeller is movable relative thereto upon simultaneous operation of the motor that rotates the impeller.

Another object of the invention is to provide a toy motor sounding device that reproduces the operational sound of a motorbike or the like by rapid rotation of an impeller against a sounding member, the sounding member being pivotally movable with respect to the impeller by a remotely controlled actuator from an inoperative position to the operating position thereof.

Another object of the invention is to provide a toy device for simulating a motor sound that is battery operated and that includes a remotely controlled manually movable handle that upon actuation energizes an electric motor for rotating an impeller, actuation of the remotely movable handle, simultaneously urging a resonator member into the path of a rotating propeller for producing the motor simulating sound.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention:

FIG. 1 is a perspective view of a bicycle illustrating the location thereon of the toy device for simulating the sound of a motor vehicle as embodied in the present invention;

FIG. 2 is an elevational view of the motor simulating device;

FIG. 3 is a sectional view taken along line 3—3 in FIG. 2;

FIG. 4 is an enlarged fragmentary plan view taken interiorly of the housing of the device and showing the inactive position of the resonator member relative to the impeller;

FIG. 5 is a view similar to FIG. 4 and showing the active or operative position of the resonator member relative to the impeller during the motor sound producing operation;

FIG. 6 is an enlarged fragmentary sectional view of the sound producing structure shown in FIG. 3 and illustrating the active or operative position of the resonator member during the motor sound producing operation; and FIG. 7 is a sectional view taken along line 7—7 in FIG. 2 and showing the remote control device that operates the motor sounding resonator member.

DESCRIPTION OF THE INVENTION

Referring now to the drawings and particularly to FIG. 1, a bicycle generally indicated at 10 is illustrated and is of conventional construction, the toy device for simulating the sound of a motor vehicle being generally indicated at 12 and shown in mounted position on the bicycle 10. For purposes of further description of the toy device 12 relative to the mounting thereof on the bicycle 10, component parts of the bicycle 10 are identified as handle bars 14 having grips 15 and a frame including a horizontal cross bar 16, a vertical bar 18 and an inclined bar 20. All of these parts of the bicycle 10 are conventional in construction as are the other component parts thereof that are illustrated in FIG. 1. Although the toy device 12 is shown mounted on the bicycle 10, it is understood that it can also be mounted on other toy vehicles such as tricycles and other pedal operated toy vehicles.

Referring now to FIGS. 2, 3 and 6, the motor sounding device 12 is illustrated in more detail; and, as shown, includes a housing generally indicated at 22, which as shown in FIGS. 3 and 6 is defined by complementary housing sections generally indicated at 24 and 26. The housing 22 simulates the appearance of an internal combustion engine exteriorly, and for this purpose the housing sections 24 and 26 define a motor casing 28 to which cylinders 30 and 32 are joined. It is understood that the external construction of the housing 22 is for ornamental purposes only so that when the toy device is mounted on the bicycle 10 as illustrated in FIG. 1, a small internal combustion engine is simulated.

The complementary sections 24 and 26 of the housing 22 are preferably secured together at the midpoint of the housing by bolts that extend through projections 34, 36 and 38, the sections 24 and 26 being formed with complementary portions, so that when the sections are placed in abutting relation, they interlock and are then secured in the interlocked position by the bolts that extend through the projections 34, 36 and 38. In order to further secure the sections 24 and 26 together, fittings 40 and 42 that are formed in interfitting relation on the sections 24 and 26 receive thereon conical collars 44 and 46 to which flexible hose portions 48 and 50 are joined, the hose portions 48 and 50 merely further simulating the constructional details of an actual internal combustion engine. The sections 24 and 26 as described are molded of a plastic material to exteriorly simulate an internal combustion engine, the marginal edges of the sections abutting in interfitting relation so that when the bolts are secured in the projections 34, 36, 38, a compact and relatively light-in-weight unit is provided.

As will be described, the toy device 12 for simulating the sound of a motor vehicle as embodied in the present invention is battery operated, batteries being indicated at 50 and 52 and being mounted in the cylinder 32. The batteries are utilized as the source of electrical energy for energizing a small electrical motor indicated at 54 in FIGS. 3 and 6, the motor 54 being electrically interconnected to the batteries 50, 52 upon engagement of appropriate switch contacts, as will be described.

In order to produce the sound that simulates a motor vehicle, such as a minibike or motorcycle, a resonator member 56 is provided and is mounted in a resonator frame assembly generally indicated at 58. The resonator frame assembly includes a fixed frame member 60 on the bottommost end of which outwardly extending foot portions 62 are joined. Also formed as part of the fixed frame member 60 of the frame assembly is a bracket 64 in which the motor 54 is mounted. Mounted for pivotal movement with respect to the fixed frame member 60 is a movable frame member 66 having an arcuate shaped flange 68 joined thereto. The resonator member 56 is secured to the movable frame member 66 and, as will be described, is pivotally movable therewith. Mounted on the lowermost end of the movable frame member 66 are bearing elements 70 that are received in V-shaped slots 72 of the foot portions 62. Thus, the movable frame 66 of the resonator frame assembly is pivotally movable with respect to the fixed frame 60, the bearings 70 providing for the pivotal movement of the frame 66 and defining the pivot connections therefor.

The resonator member 56 is formed with a generally conical configuration, the apex of which has a wear element 74 fixed thereto. As illustrated more clearly in FIGS. 4 and 5, the electric motor 54 has a shaft 76 extending outwardly therefrom on which an impeller generally indicated at 78 is mounted for rotation therewith. The impeller 78 includes a lower plate 80 and an upper plate 82 between which rollers 84 are located. It is seen that upon energizing of the motor 54 the impeller 78 is rotated therewith. As will be described, upon energizing of the motor 54 the resonator member 56 is simultaneously movable into the path of rotation of the rollers 84 of the impeller 78 and will be engaged thereby. Continued rotation of the impeller will cause the rollers 78 to rapidly strike the resonator member 56 on the wear element 74, thus, producing a staccato-like sound that simulates the sound of a motor vehicle such as a motorbike.

In order to energize the motor 54, electrical communication must be established therebetween and the batteries 50, 52. An electrical lead 86 (FIG. 6) is interconnected to a contact (not shown) that engages one side of the battery 52, a contact bar 88 that is mounted in a head 90 of the cylinder 32 electrically interconnecting the batteries 50, 52 at the uppermost end thereof. Another contact (not shown) engages the battery 50 and is interconnected to a contact member 92 through a lead 94 (FIG. 3). A second movable contact 96 is mounted on the flange 68 of the movable frame 66 for movement therewith and is connected to a lead 98 (FIG. 3) that, in turn, is interconnected to the motor 54. It is seen that when the movable contact 96 that is mounted on the movable resonator frame member 66 engages the fixed contact 92, the circuit to the motor 54 from the batteries 50, 52 will be completed and the impeller 78 will be rotated. It is further seen that upon movement of the movable contact 96 into engagement with the fixed contact 92, the resonator member 56 will be pivotally moved into that position where the wear element 74 thereof will be contacted by the rollers 84 of the rotating impeller 78.

In order to conveniently urge the resonator member 56 into the path of the rollers 87 of the impeller 78, and to simultaneously energize the motor 54, a crank lever 99 is provided and is formed with a crank arm 100 that engages the rear surface of the movable frame 66. A vertical portion 101 of the crank lever 99 that is connected to the crank arm 100 extends through an opening in the housing, the opening defining a bearing for retaining the crank lever 99 in place. As illustrated in FIGS. 4 and 5, an eyelet 102 is formed on the outermost end of the crank lever 99 and has a cable 103 secured thereto. The cable 103 extends through an elongated tubing 104 that is secured at the outermost end thereof in a handle assembly generally indicated at 106. The handle assembly 106 is mounted on the handle bar 14 of the bicycle and replaces a handgrip 15. For this purpose a head portion 108 is provided that is fixed to the handle bar 14 by screws 109 (FIG. 2). Rotatably mounted in the head portion 108 is a handgrip 110 to which an enlarged portion 111 is joined, the enlarged portion 111 having free rotation within the head portion 108 and having the outermost end of the cable 103 secured thereto at 112 (FIG. 7). Rotation of the handgrip 110 within the hand portion 108 retracts the cable 103 and thereby pivots the crank lever 99. Pivotal movement of the crank lever 99 causes the crank arm 100 to pivotally urge the movable frame member 66 to that position shown in FIGS. 5 and 6. As the resonator frame member 66 pivots outwardly toward the impeller 76, the electrical contact 96 mounted on the flange 68 moves into engagement with the electrical contact 92 to energize the motor 54. A spring 114 is secured to the flange 68 and a portion of the section 24 of the housing 12 and normally urges the resonator frame member 66 to an inoperative position. Movement of the frame member 66 and the resonator member 56 to the operative position thereof occurs when the grip 110 as mounted on the handle bar 14 is rotated. Release of the grip 110 will cause the spring 114 to return the frame member 66 to the inoperative position as illustrated in FIG. 4.

The toy device 12 as illustrated in FIG. 1 is mounted on the bicycle 10, and for this purpose convenient straps indicated at 116 are provided and are attached to the inclined bar 20 and the vertical bar 18 of the bicycle frame. An additional strap may be secured to the cross bar 16 if required.

In use of the toy device 12 and with the device mounted in position on a bicycle as illustrated in FIG. 1, the operator rotates the grip 110 for operating the device to simulate the sound of a motor vehicle. By rotating the grip 110, the cable 103 pivots the lever crank 99 to move the resonator frame member 66 in a pivotal movement against the action of the spring 114. Simultaneously with the pivotal movement of the resonator frame member 66 and the resonator member 56 that is mounted thereon, the contact 96 is moved into engagement with the contact 92, thereby completing a circuit to the motor 54. Energizing of the motor 54 rotates the shaft 76 and the impeller 78 mounted thereon. The rollers 84 of the impeller 78 rotate therewith, and since the resonator member 56 has been moved into the path of the rollers 84, the rollers will strike the wear element 74 of the resonator member 56 in a staccato-like action. As the rollers 84 repetitively strike the resonator member 56, the resonator member 56 emits an amplified sound that simulates the sound of a motor vehicle. When the occupant of the bicycle 10 releases the handgrip 110, the spring 114 urges the resonator frame member 66 and the resonator member 56 mounted thereon to an inoperative position as illustrated in FIG. 4, and the motor 54 is simultaneously deenergized as the contact 96 disengages with the contact 92. It is seen that a rapid intermittent rotation of the grip 110 will produce a sound that will simulate the revving sound of a motor vehicle. This sound may be varied depending upon movement of the grip 110 and the period of time that the resonator member 56 is allowed to remain in the path of the rotating rollers 84.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A toy device for simulating the sound of a motor vehicle, comprising a housing, an electric motor mounted in said housing and including a shaft to which an impeller is connected for rotation with said shaft, a resonator frame assembly mounted in said housing and including a resonator member that is mounted for limited pivotal movement in said assembly, said resonator member having a generally conical configuration, the apex of which is located adjacent to said impeller, and a control member that is movable to energize said motor for rotating said impeller and to simultaneously pivotally move said resonator member to a position for engagement of the apex thereof by said rotating impeller, wherein said rotating impeller repetitively strikes the apex of said impeller to produce an amplified sound simulating that of a motor vehicle.

2. A toy device as claimed in claim 1, said control member including a lever that is engageable with said pivotally mounted resonator member, and remote control means interconnected to said lever and being operable to move said lever for pivotally moving said resonator member into the path of said rotating impeller.

3. A toy device as claimed in claim 1, said resonator frame assembly further including a fixed frame member that is mounted in said housing and receiving said electric motor thereon, and a movable frame member on which said resonator member is mounted.

4. A toy device for simulating the sound of a motor vehicle, comprising a housing, an electric motor mounted in said housing and including a shaft to which an impeller is connected for rotation with said shaft, a resonator frame assembly mounted in said housing and including a resonator member that is mounted for limited pivotal movement in said assembly, said resonator member having a generally conical configuration, the apex of which is located adjacent to said impeller, means for simultaneously energizing said motor for rotating said impeller and pivotally moving said resonator member to a position for engagement of the apex thereof by said rotating impeller, wherein said rotating impeller repetitively strikes the apex of said impeller to produce an implified sound simulating that of a motor vehicle, said resonator frame assembly further including a fixed frame member that is mounted in said housing and receiving said electric motor thereon, a movable frame member on which said resonator member is mounted, battery means mounted in said housing and being electrically connectable to said motor for the energizing thereof, an electrical contact electrically connected to said motor and interconnected to said movable frame member and movable therewith, and a fixed contact electrically interconnected to said battery means and being engageable by said movable contact upon pivotal movement of said movable frame member wherein said motor is energized to rotate said impeller.

5. A toy device as claimed in claim 4, said energizing and moving means including a lever pivotally mounted on said housing and engageable with said movable frame member, and remote control means interconnected to said lever and being operable to move said lever for pivotally moving said resonator member into the path of said rotating impeller.

6. A toy device as claimed in claim 5, said remote control means including a rotatable hand operated member and an elongated flexible cable interconnected to said lever, said cable being connected to said hand operated member and being responsive to rotation thereof for urging said lever in a pivotal movement thereof.

7. A toy device as claimed in claim 6, spring means connected to the pivotally movable resonator frame member and to said housing in which the resonator frame assembly is mounted, said spring means normally urging said movable frame member and contact mounted thereon to a non-operative position.

8. A toy device for simulating the sound of a motor vehicle, comprising a housing, an electric motor mounted in said housing and including a shaft to which an impeller is connected for rotation with said shaft, a resonator frame assembly mounted in said housing and including a resonator member that is mounted for limited pivotal movement in said assembly, said resonator member having a generally conical configuration, the apex of which is located adjacent to said impeller, means for simultaneously energizing said motor for rotating said impeller and pivotally moving said resonator member to a position for engagement of the apex thereof by said rotating impeller, wherein said rotating impeller repetitively strikes the apex of said impeller to produce an amplified sound simulating that of a motor vehicle, mounting elements secured to said housing for mounting said housing on the frame of a bicycle, said energizing and moving means further including a handle mountable for rotation on the handle bar of said bicycle, a cable interconnected to said rotatable handle, and a lever interconnected to said cable and to said resonator member, and contact means mounted on said housing and resonator assembly wherein said lever is responsive to remote rotation of said handle for pivotally moving said resonator member and for completing a circuit from said contact means to said electric motor for rotating said impeller.

9. A toy device as claimed in claim 8, said contact means including a fixed contact mounted on said housing and a contact mounted for movement with said resonator member, said contact means being electrically interconnected to said motor for energizing said motor upon engagement of said fixed contact by the contact mounted for movement with said pivotal resonator member.

10. A toy device as claimed in claim 9, said resonator frame assembly including a fixed frame member mounted in housing and having projecting foot portions, and a movable frame member to which said resonator member is fixed having bearing members receivable in said foot portions for pivotally mounting said movable frame member relative to said fixed frame member, and spring means connected to said movable frame member for normally urging said movable frame member to the inoperative position thereof, wherein said contacts are disengaged and said motor is deenergized.

* * * * *